(12) United States Patent
Wagmann

(10) Patent No.: US 9,465,698 B2
(45) Date of Patent: Oct. 11, 2016

(54) SYSTEMS AND/OR METHODS FOR DATA RECOVERY IN DISTRIBUTED, SCALABLE MULTI-TENANT ENVIRONMENTS

(71) Applicant: Software AG, Darmstadt (DE)

(72) Inventor: Christoph Wagmann, Bexbach (DE)

(73) Assignee: Software AG, Darmstadt (DE)

( * ) Notice: Subject to any disclaimer, the term of this patent is extended or adjusted under 35 U.S.C. 154(b) by 349 days.

(21) Appl. No.: 14/199,759

(22) Filed: Mar. 6, 2014

(65) Prior Publication Data
US 2015/0254142 A1 Sep. 10, 2015

(51) Int. Cl.
| | |
|---|---|
| G06F 11/14 | (2006.01) |
| H04L 29/14 | (2006.01) |
| H04L 29/08 | (2006.01) |
| H04L 29/06 | (2006.01) |

(52) U.S. Cl.
CPC ....... *G06F 11/1464* (2013.01); *G06F 11/1451* (2013.01); *H04L 67/1095* (2013.01); *H04L 69/28* (2013.01); *H04L 69/40* (2013.01); *G06F 2201/84* (2013.01); *G06F 2201/85* (2013.01)

(58) Field of Classification Search
CPC .......... G06F 11/1464; G06F 11/1451; G06F 2201/84; G06F 2201/85; H04L 69/28; H04L 69/40; H04L 67/1095
USPC ....................................................... 707/791
See application file for complete search history.

(56) References Cited

U.S. PATENT DOCUMENTS

| | | | | |
|---|---|---|---|---|
| 5,978,813 | A * | 11/1999 | Foltz | G06F 17/30067 |
| 6,442,685 | B1 * | 8/2002 | French | H04L 67/1002 |
| | | | | 713/1 |
| 6,947,963 | B1 * | 9/2005 | Agarwal | H04L 45/00 |
| | | | | 709/201 |
| 7,457,830 | B1 * | 11/2008 | Coulter | G06F 11/1471 |
| 8,392,482 | B1 * | 3/2013 | McAlister | G06F 17/30584 |
| | | | | 707/771 |
| 8,429,134 | B2 | 4/2013 | Chan | |
| 8,595,546 | B2 * | 11/2013 | Dalton | G06F 17/30581 |
| | | | | 714/4.1 |
| 8,874,508 | B1 * | 10/2014 | Mittal | G06F 11/2097 |
| | | | | 707/610 |
| 8,966,027 | B1 * | 2/2015 | Brandwine | G06F 9/45533 |
| | | | | 709/200 |

(Continued)

FOREIGN PATENT DOCUMENTS

| | | | | |
|---|---|---|---|---|
| JP | 2010165255 | * | 7/2010 | G06F 12/00 |

OTHER PUBLICATIONS

Elmore et al., "Towards an Elastic and Autonomic Multitenant Database", in Proceedings of NetDB ' 11, Jun. 12, 2011, Athens, Greece, 6 pages.*

(Continued)

*Primary Examiner* — Phuong Thao Cao
(74) *Attorney, Agent, or Firm* — Nixon & Vanderhye PC

(57) ABSTRACT

Certain example embodiments relate to techniques for recovering registry information and recreating the entire registry for all available tenants in a scalable, multi-tenant distributed environment, while also potentially looking into all of the running services where the most up-to-date data could exist. Dynamic real-time or substantially real-time recreation of connections between a web application and the latest instance of a tenant in such an environment (e.g., following a failure of one of the databases holding the tenant data, a corruption of the registry entry pointing to the tenant, and/or the like) is made possibly by, for instance, comparing the timestamps of the last written entities in order to examine the most current data and "re-bundle" the last master/replication instances, e.g., for restores in an environment where a rolling failover procedure is implemented.

30 Claims, 9 Drawing Sheets

(56) References Cited

U.S. PATENT DOCUMENTS

| | | | |
|---|---|---|---|
| 8,984,243 B1* | 3/2015 | Chen | G06F 3/065 711/162 |
| 9,218,246 B2* | 12/2015 | Nagesharao | G06F 11/1415 |
| 9,274,903 B1* | 3/2016 | Garlapati | G06F 11/2002 |
| 9,298,728 B2* | 3/2016 | McAlister | G06F 11/2025 |
| 2003/0221074 A1* | 11/2003 | Satoyama | G06F 3/0605 711/162 |
| 2004/0073677 A1* | 4/2004 | Honma | G06F 3/0604 709/226 |
| 2004/0098637 A1* | 5/2004 | Duncan | G06F 11/2069 714/6.23 |
| 2006/0182255 A1* | 8/2006 | Luck, Jr. | H04M 3/12 379/220.01 |
| 2007/0203944 A1* | 8/2007 | Batra | G06F 17/30575 |
| 2007/0282929 A1* | 12/2007 | Kobayashi | G06F 11/1461 |
| 2008/0268853 A1* | 10/2008 | Bosch | H04W 24/04 455/442 |
| 2010/0036850 A1* | 2/2010 | Garman | G06F 11/1448 707/636 |
| 2010/0036851 A1* | 2/2010 | Paterson-Jones | G06F 17/30067 707/636 |
| 2010/0036931 A1* | 2/2010 | Certain | G06F 11/1451 709/214 |
| 2010/0037031 A1* | 2/2010 | DeSantis | G06F 11/1464 711/162 |
| 2010/0058012 A1* | 3/2010 | Okada | G06F 11/1461 711/162 |
| 2010/0125842 A1* | 5/2010 | Friedman | G06F 12/16 718/1 |
| 2011/0099146 A1* | 4/2011 | McAlister | G06F 11/3006 707/634 |
| 2011/0099420 A1* | 4/2011 | MacDonald McAlister | 714/6.32 |
| 2011/0289508 A1* | 11/2011 | Fell | G06F 9/5083 718/105 |
| 2012/0173483 A1* | 7/2012 | Hartig | G06F 9/4856 707/610 |
| 2012/0233123 A1* | 9/2012 | Shisheng | G06F 11/004 707/639 |
| 2012/0233245 A1* | 9/2012 | Liu | H04L 69/40 709/203 |
| 2012/0259894 A1 | 10/2012 | Varley et al. | |
| 2013/0024635 A1* | 1/2013 | Araki | G06F 3/0605 711/162 |
| 2013/0111261 A1* | 5/2013 | Dalton | G06F 17/30581 714/4.11 |
| 2013/0163041 A1* | 6/2013 | Sato | G06K 15/1805 358/1.15 |
| 2013/0276070 A1 | 10/2013 | Lee | |
| 2014/0180915 A1* | 6/2014 | Montulli | G06Q 30/04 705/40 |
| 2014/0281700 A1* | 9/2014 | Nagesharao | G06F 11/1415 714/15 |
| 2014/0325214 A1* | 10/2014 | Sadrolashrafi | G06F 21/6218 713/165 |
| 2015/0254142 A1* | 9/2015 | Wagmann | G06F 11/1464 714/19 |

OTHER PUBLICATIONS

Kaur et al., "Analysis of Different Techniques Used for Fault Tolerance", International Journal of Computer Science and Information Technologies, vol. 5 (3), 2012, pp. 4086-4090.*

Savinov, Sergey et al., "Dynamic Database Replica Provisioning through Virtualization," CloudDB '10 Proceedings of the Second International Workshop on Cloud Data Management, Oct. 30, 2010, pp. 41-46.

* cited by examiner

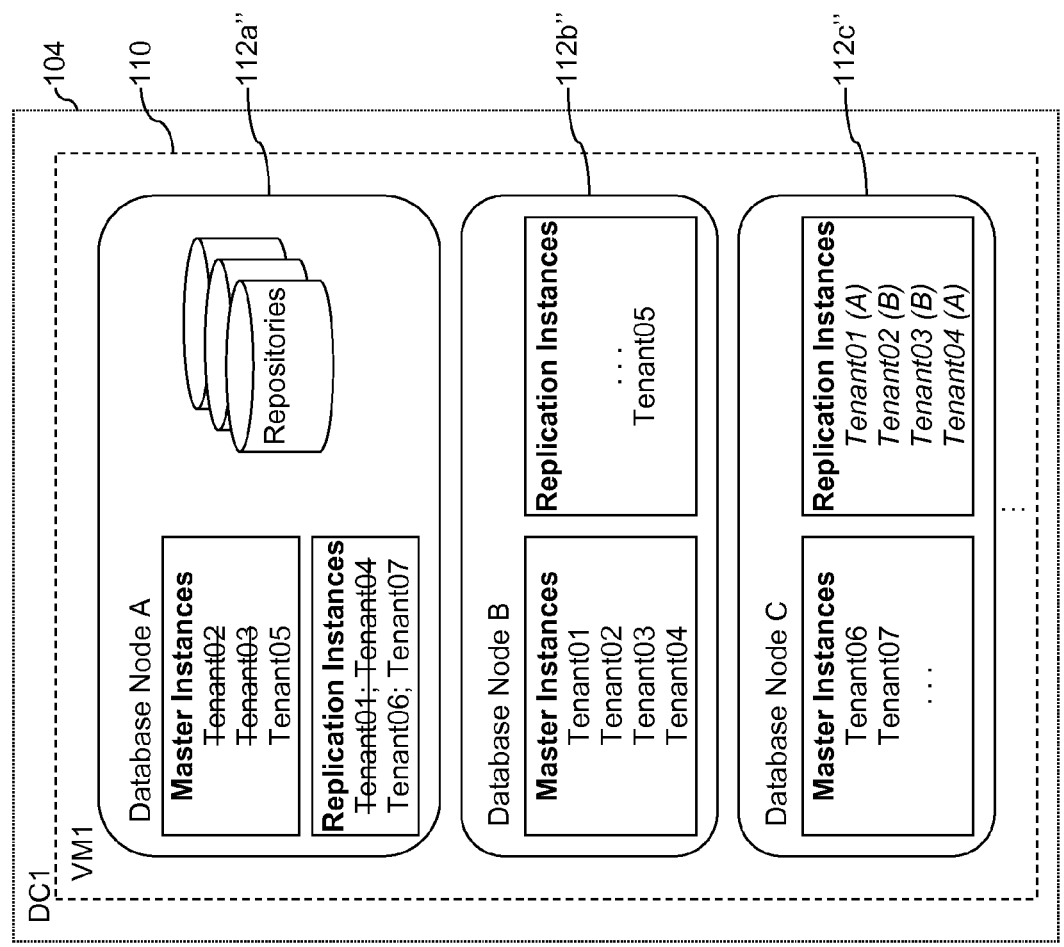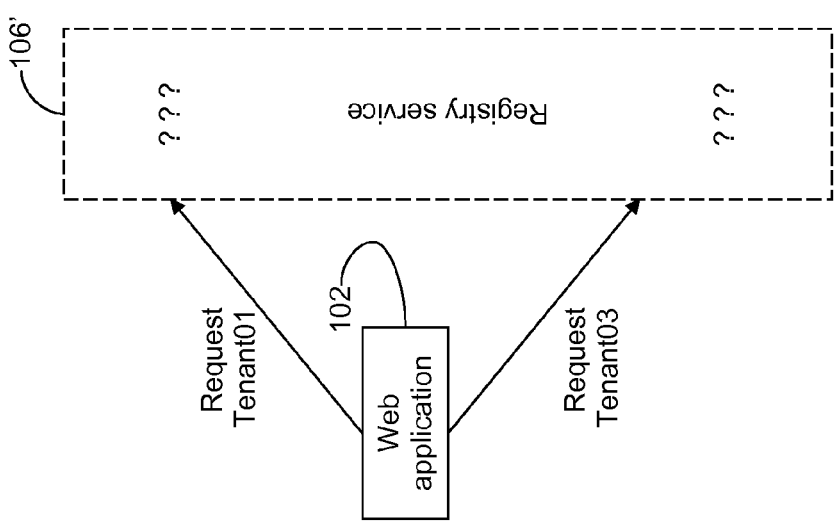
FIG. 4

SYSTEMS AND/OR METHODS FOR DATA RECOVERY IN DISTRIBUTED, SCALABLE MULTI-TENANT ENVIRONMENTS

TECHNICAL FIELD

Certain example embodiments described herein relate to scalable, distributed multi-tenant environments. More particularly, certain example embodiments described herein relate to techniques for data recovery in distributed, scalable multi-tenant environments.

BACKGROUND AND SUMMARY OF EXAMPLE EMBODIMENTS

In the computer systems architecture world, cloud computing has recently received some attention. Although there are many competing definitions for "cloud computing," it is fairly well accepted that cloud computing generally involves (1) the delivery of computing as a service rather than a product, and (2) providing shared processing and/or storage resources, software, information, etc., to computers and other devices as an oftentimes metered service over a network (typically the Internet). In a cloud computing environment, end users do not necessarily need to know the physical location and configuration of the system that delivers the services. Applications typically are delivered to end-users as the service, enabling transparent access to the cloud-based resources.

In a scalable, distributed multi-tenant scenario such as a cloud computing environment, information about where components such as services, backend databases supporting a service infrastructure, and the like, oftentimes are stored via a registration service or the like. A web application or the like can request a particular resource via a registry service and thus does not need to know where the components themselves are located. In this regard, FIG. 1 is an example block diagram showing multiple tenants using a web application 102 to access components in a backend datacenter 104 via a registry service 106 in an illustrative distributed cloud environment.

As will be appreciated from FIG. 1, each tenant (in this example, tenants 1-4) has a corresponding assignment 108a-108d in this registry 106, and every application trying to retrieve data from a specific tenant in the backend, e.g., a database server, can ask the registry service 106 where exactly the database instance is located. In this FIG. 1 example, the datacenter 104 includes a first virtual machine 110 that supports database nodes 112a-112n which, in turn, each has one or more repositories. The assignments indicate which of the database nodes 112a-112n serve as master and replication instances for the tenants. With respect to the master and replication instance assignments, it can be seen that the tenants assigned in a given node's master and replication instances do not overlap, e.g., so that there is some fault tolerance.

The FIG. 1 example also demonstrates how a request to the registry service to the datacenter instance may be processed. In that regard, when a tenant using the web application 102 makes a request to the registry service 106, the registry service 106 checks the corresponding assignments 108a-108d and attempts to connect to the appropriate database node 112a-112n that is the master instance for the specific tenant making the request. It is noted that the FIG. 1 example is simplified in that there may be multiple datacenters, each hosting one or more physical and/or virtual machines that support the callable services and their supporting backend components. There also may be more than four tenants in some implementations. The registry service thus may be quite helpful, and indeed required, in order to help keep track of everything in such a complicated system.

The FIG. 1 example configuration is different than a conventional computing environment, where each application is precisely connected and configured to use a static bundled backend. Such an arrangement is shown in FIG. 2. As will be appreciated from FIG. 2, there is one application 202 connected to one database 204 in a first server 206. If there is a system crash (e.g., if a connection cannot be made between the application 202 and the backed database 204, as shown in the bottom portion of FIG. 2), it is easy to restart the environment and make things functional again, as there is only one data source and its details (e.g., where it is located, how it is configured, how it is instantiated, etc.) are known.

Unfortunately, however, the ability to restore instances and recover from system crashes, failures, or the like, becomes increasing complicated as the complexity of a scalable, distributed multi-tenant environment grows—and as more complicated techniques for processing requests are introduced. For instance, a "rolling failover" procedure may be implemented in connection with the FIG. 1 example and, thus, more than two instances can be used as a master/replication pair in the lifetime of the tenant. To keep track of everything, each assignment 108a-108d in the registry service 106 may include the information needed for executing a request to the backend datacenter 104. This arrangement may help reduce the likelihood of the web application 102 being unable to access the needed backend services from the datacenter 104.

Yet if the registration information itself is lost, e.g., as a result of a system crash, failure, or the like, it could be very difficult to recover the still-available data (e.g., because the locations of the backend components, the mappings as between master/replication pairs, etc., may not be known). Similar difficulties could be presented if, for example, the registry information becomes inconsistent as a result of misuse from the application side, a faulty entry by an administrator or other party, a system crash, etc. These situations need to be handled, but all information may be lost and there might not be an easy-to-implement recovery process for recovering the entries (e.g., compared to the FIG. 2 scenario, where the data recovery is trivial because of the known, static configuration details). In the end, this could mean total data loss.

One way of attempting to reduce the likelihood of such problems in a scalable, multi-tenant distributed environment involves simple backup of the registry entries. But this approach may not be of much help in a dynamic system, if inconsistencies are encountered, etc. Indeed, new tenants can be created at a high frequency and may leave at a high frequency. The same may be true with failover events, which can lead to the reassignment of tenants to replication instances. As a result, a real-time or substantially real-time back of the registry might be needed, even though it can be hard to implement such an approach. And even in that case, a real-time or substantially real-time back of the registry might not be able to handle data loss resulting from inconsistencies.

As alluded to above, in a conventional single tenant, static and non-distributed environment with a database and an application using this database, it is trivial to recover from a crash, because the areas that can be looked to for data after a system crash are known. In addition, the application is still configured so that it can access the database backend again.

The issues of how to recover from the problems noted above do not arise in such non-distributed environments, where every application is configured exactly so that it always knows where to look for the database. But even in a simplistic distributed scenario with something like the registry service discussed above, if the registry entries are lost after a system crash, there may not be a reliable way of retrieving the information and returning the environment to a state in which the data of a specific tenant is restored and in which it is known whether the restored data is the most up-to-date data.

Although other somewhat related attempts have been made, they unfortunately do not help in resolving the problems discussed above. For instance, U.S. Publication No. 2013/0276070 (which is hereby incorporated herein by reference) describes the authentication of a user or, more generally, the search for credentials in a distributed environment at different instances hosted at special geo-locations. Different datacenters at distributed locations may be used, and users can be replicated to different instances. Although the '070 publication uses a kind of registry service like a master user table, there is only a load balancer that decides to which geo-location a request to an authentication instance will be sent. This request will be rerouted until an instance is found. Thus, in this approach, even in a failure or system crash, there is no need to recover or restore important registry information.

In the scenario covered in "Dynamic Database Replica Provisioning through Virtualization" (written by Sergey Savinov and Khuzaima Daudjee), the authors only use one master instance and several replication instances for a specific user without considering a second dimension that covers multi-tenant-aware backends. The replication is triggered by a batch job using transaction logs, which is referred to therein as "refreshing." A load balancer alone selects the destination server that is, according to the description, configured for a specific backend. In this case, there is no need for a registry service. Thus, even if this arrangement is implemented in connection with a virtual machine and in a dynamic manner, it represents a more traditional installation that can handle traffic peaks and does not, for example, address data inconsistency issues.

Furthermore, it will be appreciated that this Savinov and Daudjee paper does not involve the recreation of a registry service, e.g., because the approach described therein does not use any such registration service at all and instead relies on a load balancer for traffic shaping. In a failure scenario, this approach can only use the replica containing the present data according to the transaction logs, and implementations therefore may encounter data losses because not all data has been replicated if the batch job was not triggered after the latest write operations to the master instance. This in turn implies that no real time switching is possible, because the replications may not all be up-to-date, even with respect to the instance that was refreshed last. This Savinov and Daudjee paper thus does not account for the added dimension of a multi-tenant-aware infrastructure with registry service at all, as the authors only discuss how to switch to a replication instance and how to rebuild the most up-to-date data (but likely not real-time replication), performed via batch jobs reading the transaction logs.

U.S. Pat. No. 8,429,134 (which is hereby incorporated herein by reference) describes a way to recover a distributed database in the case of faulty cache flushes after a failure of a database node. The '134 patent uses a buffer cache per instance for performance improvements. This cache contains so-called blocks of data. If a block has to be modified, it said to be quicker to save the changes to a redo-log and flush them after a period (e.g., at so-called checkpoints). If one or more database nodes fail a single surviving instance, the recovery instance will take care of the recovery and will read the redo-logs of each crashed instance. All log entries dated after a certain checkpoint will be written to the database to be able to restore all of the data written only to the redo-logs. In this case, there is no central registry that must be recovered. The database itself handles the recovery of cache entries that were not flushed. However, this approach does not take care of lost registry entries or inconsistencies in a central registry service.

U.S. Publication No. US 2012/0259894 (which is hereby incorporated herein by reference) generally discusses the problems that one faces by replicating database systems but is scant on details concerning recovery procedures, the recreation of registry services, etc.

It therefore will be appreciated that it would be desirable to solve one or more of the above-described and/or other problems. For example, it will be appreciated that it would be desirable to provide systems and/or methods for data recovery in distributed, scalable multi-tenant environments to handle problems that arise when a registry service itself goes down, when inconsistent data entries arise, and/or the like.

An aspect of certain example embodiments relates to techniques for recovering registry information and recreating the entire registry for all available tenants in a scalable, multi-tenant distributed environment, while also potentially looking into all of the running services where the most up-to-date data could exist.

Another aspect of certain example embodiments relates to the dynamic real-time or substantially real-time recreation of connections between a web application and the latest instance of a tenant in a multi-tenant environment hosted in a highly distributed multi datacenter environment (such as, for example, a cloud computing environment) following a failure of one of the databases holding the tenant data, a corruption of the registry entry pointing to the tenant, and/or the like.

Another aspect of certain example embodiments relates to an automatic recovery solution that compares the timestamps of the last written entities in order to examine the most current data and "re-bundle" the last master/replication instances, e.g., for restores in an environment where a rolling failover procedure is implemented.

In certain example embodiments, there is provided a method of recovering from a fault in a multi-tenant distributed environment comprising processing resources including at least one processor and in which a registry stores information indicating which of a plurality of nodes in the multi-tenant distributed environment are assigned to host master and replication instances storing data for the respective tenants. The method comprises, in response to a detected fault: obtaining a list of running instances in the multi-tenant distributed environment; identifying from the list of running instances, for each said tenant, one or more candidate instances that might host master and/or replication instances for the respective tenant; and for each tenant for which exactly one candidate instance is identified, re-registering with the registry this identified candidate instance as the master instance for the respective tenant. In addition, for each tenant for which exactly two candidate instances are identified: a determination is made as to whether timestamps of the last changes for each of these candidate instance are available; and in response to a determination that timestamps of the last changes for each these candidate instance are available, the two candidate instances are re-registered with the registry as master and replication instances for the respective tenant based at least in part on the timestamps, if possible.

In addition to the features of the previous paragraph, in certain example embodiments, for each tenant for which exactly one candidate instance is identified: a determination may be made as to whether there is a free instance on a node that does not host this candidate instance; and in response to a determination that there is not a free instance on a node that does not host this candidate instance, this identified candidate instance may be re-registered with the registry as the master instance for the respective tenant and a replication instance for the respective tenant is not re-registered. Furthermore, the method may include in response to a determination that there is a free instance on a node that does not host this candidate instance: re-registering with the registry this identified candidate instance as the master instance for the respective tenant, replicating this identified candidate instance, and re-registering with the registry this replicated identified candidate instance as the replication instance for the respective tenant.

In addition to the features of either of the two previous paragraphs, in certain example embodiments, for each tenant for which exactly two candidate instances are identified and in response to a determination that timestamps of the last changes for each these candidate instance are available, the method may further include: determining whether the timestamps fall within a predefined latency tolerance; and in response to a determination that the timestamps fall within the predefined latency tolerance, re-registering with the registry the two candidate instances as master and replication instances for the respective tenant based at least in part on the timestamps and based at least in part on which instance has later written entities.

In addition to the features of the previous paragraph, in certain example embodiments, for each tenant for which exactly two candidate instances are identified, and in response to determinations that (a) the timestamps of the last changes for each these candidate instance are unavailable, and (b) the timestamps do not fall within the predefined latency tolerance: the two candidate instances may be re-registered with the registry as master and replication instances for the respective tenant based at least in part on information about views defined in the instances and based at least in part on which instance has later written entities, e.g., when it is possible to gather the information about the respective views of the instances.

In certain example embodiments, a method of operating a distributed multi-tenant environment is provided. Master/replication instance pairings indicating, for each said tenant in the distributed multi-tenant environment, which backend nodes serve as master and replication data instances for the respective tenant, are stored in a registry. Using processing resources including at least one processor, a web application is operated in response to a request from a client device, with the web application accessing an appropriate master instance in dependence on the tenant using the client device and based on a lookup using the registry. Time-related information is saved for each operation performed on each entity in each said instance. In response to a first fault type causing a master instance to become unavailable, the corresponding master/replication instance pairing is updated in the registry such that the associated replication instance becomes the new master instance in that pairing and such that a free instance becomes the new replication instance in that pairing, e.g., using processing resources. In response to a second fault type causing the registry to become unavailable: at least one candidate instance is identified for each said tenant to be used in recreating the registry and master/replication instance pairings in the recreated registry; and for each tenant for which two or more candidate instances are identified, time-related information is processed to recreate the registry and master/replication instance pairings in the recreated registry, e.g., using the processing resources.

In certain example embodiments, a distributed multi-tenant computing system is provided. The system includes processing resources including at least one processor. A non-transitory computer readable storage medium tangibly stores a registry including master/replication instance pairings indicating, for each said tenant in the distributed multi-tenant computing system, which backend nodes serve as master and replication data instances for the respective tenant. A web application is operable in connection with the processing resources and in response to a request from a client application running on a client device, with the web application being configured to access an appropriate master instance in dependence on the tenant using the client device and based on a lookup using the registry. The processing resources are configured to at least: save time-related information for each operation performed on each entity in each said instance; in response to a first fault type causing a master instance to become unavailable, update the corresponding master/replication instance pairing in the registry such that the associated replication instance becomes the new master instance in that pairing and such that a free instance becomes the new replication instance in that pairing; and in response to a second fault type causing the registry to become unavailable, identify at least one candidate instance for each said tenant to be used in recreating the registry and master/replication instance pairings in the recreated registry, and for each tenant for which two or more candidate instances are identified, process the time-related information to recreate the registry and master/replication instance pairings in the recreated registry.

In addition to the features of either of the two previous paragraphs, in certain example embodiments, for each tenant for which only one candidate instance is identified, the one identified candidate instance may be registered in the registry as the master instance in the master/replication instance pairing for the respective tenant; and, if possible, a free instance may be assigned as the replication instance for the respective tenant and the assigned free instance may be registered in the master/replication instance pairing.

In addition to the features of any of the three previous paragraphs, in certain example embodiments, the processing of time-related information may further comprise for each tenant for which two or more candidate instances are identified: limiting the number of identified candidate instances to two when more than two candidate instances are identified; and registering in the registry one identified candidate instance as the master instance and the other identified candidate instance as the replication instance in the master/replication instance pairing for the respective tenant, based at least in part on the time-related information for each of these identified candidate instances.

Certain example embodiments relate to a distributed multi-tenant computing system. Processing resources include at least one processor. A non-transitory computer readable storage medium tangibly stores a registry including master/replication instance pairings indicating, for each said tenant in the distributed multi-tenant computing system, which backend nodes serve as master and replication data instances for the respective tenant. A server-side application is operable in connection with the processing resources and in response to a request from a client application running on a client device, the server-side application being configured to access an appropriate master instance in dependence on the tenant using the client device and based on a lookup using the registry. The processing resources are configured to at least: automatically detect faults of different fault types; in response to a detected fault of a first fault type that causes a master instance to become unavailable, update the corresponding master/replication instance pairing in the registry in accordance with a rolling failover scheme. The processing resources are further configured, in response to a detected fault second fault type, different from the first fault type, that causes the registry to become unavailable to at least: identify at least one candidate instance for each said tenant to be used in recreating the registry and master/replication instance pairings therein; for each tenant for which only one candidate instance is identified, register the one identified candidate instance as the master instance in the master/replication instance pairing for the respective tenant in recreating the registry; and for each tenant for which two or more candidate instances are identified, process corresponding aspects of each said identified candidate instance in order to (a) select, from the two or more identified candidate instances, a candidate master instance and a candidate replication instance, and (b) register the selected candidate master instance and the selected candidate replication instance as master/replication instance pairings in recreating registry.

In addition to the features of the previous paragraph, in certain example embodiments, the processing resources may be further configured, for each tenant for which only one candidate instance is identified, to at least assign a free instance as the replication instance for the respective tenant and register the assigned free instance in the respective master/replication instance pairing in recreating the registry, if possible.

In addition to the features of either of the two previous paragraphs, in certain example embodiments, for each tenant for which two or more candidate instances are identified, a plurality of corresponding aspects may be processed in a predetermined order until either (a) it becomes possible to select, from the two or more identified candidate instances, a candidate master instance and a candidate replication instance, or (b) all corresponding aspects have been processed. For instance, the corresponding aspects may include time-related information, size-related information, and/or the like.

In addition to the features of the previous paragraph, in certain example embodiments, once all corresponding aspects have been processed, candidate master and replication instances may be selected at random from the two or more identified candidate instances.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 4 is a block diagram showing what happens when registry information is lost as a result of a system crash;

DETAILED DESCRIPTION OF EXAMPLE EMBODIMENTS

Certain example embodiments relate to the dynamic real-time or substantially real-time recreation of connections between a web application and the latest instance of a tenant in a multi-tenant environment hosted in a highly distributed multiple datacenter environment (such as, for example, a cloud computing environment) following a failure of one of the databases holding the tenant data, a corruption of the registry entry pointing to the tenant, and/or the like. More particularly, certain example embodiments relate to the automatic recreation of connections between a web application and the latest master/replicate instance of a tenant and the location of its latest data following any one or more failure modes (e.g., a database malfunction, registry corruption, etc.). This is accomplished in certain example embodiments on-the-fly in a multi-tenant environment hosted in a distributed environment (e.g., such as in a cloud computing environment where several datacenters hosting multiple virtual and/or physical machines is the norm). The latest master/replication data entries are located (with the tenant data being stored in more than one pair of master/replicate instances to provide rolling failover) for the tenants, and the registry entries are recreated therefrom. Certain example embodiments thus are advantageous in highly volatile multi-tenant environments where tenants are coming and going quickly, and where conventional recovery mechanisms (e.g., simple registry backup/recovery, manual intervention, etc.) are insufficient when it comes to providing an automatic solution for such a dynamic environment.

Figure 1:
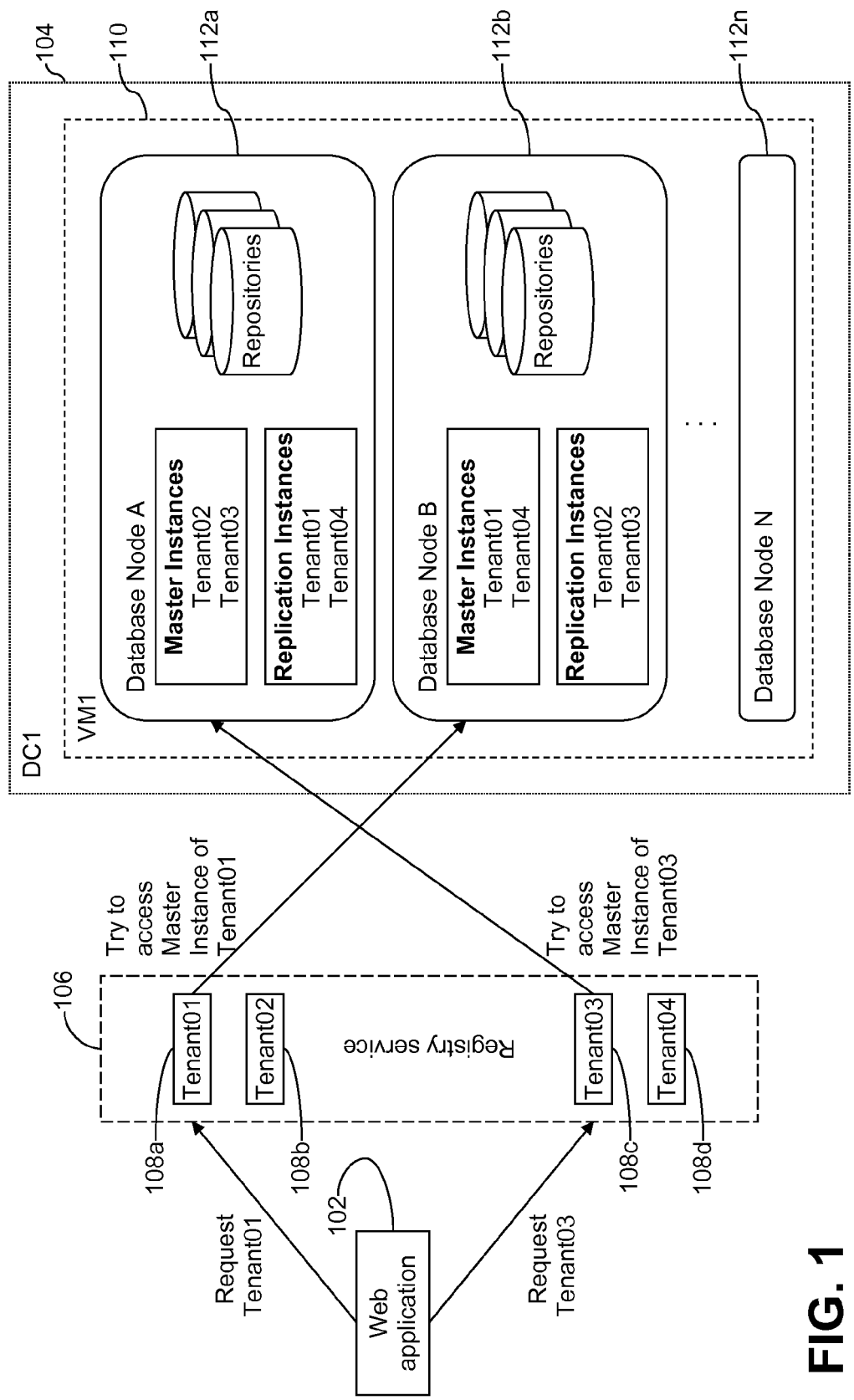
FIG. 1 is an example block diagram showing multiple tenants using a web application to access components in a backend datacenter via a registry service in an illustrative distributed cloud environment.
Figure 2:
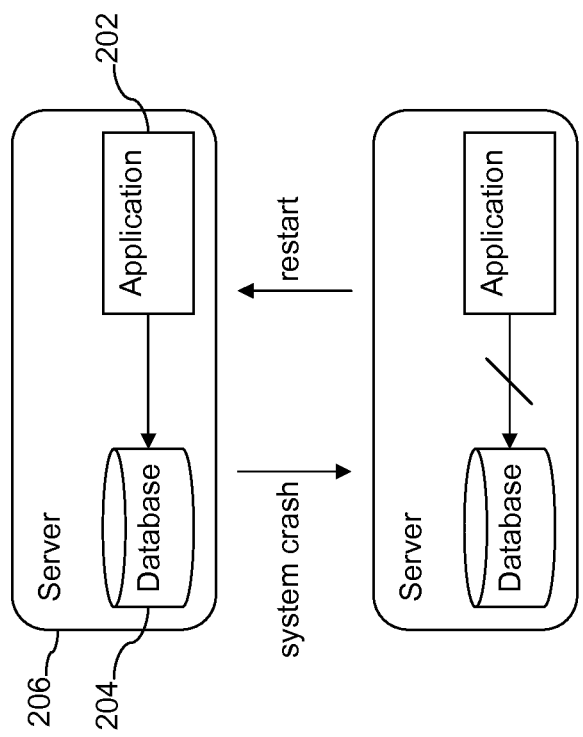
FIG. 2 is illustrative view of how crashes and restores may be handled in a conventional static environment.

As explained above, data recovery after a system crash in a non-distributed environment is quite trivial because one has knowledge about the service or location where the data can be found. That is, as described in connection with FIG. 2, after a system crash, as soon as everything is up and running again, one knows where to look for the data, especially if a single database or storage device is being used. In fact, in some scenarios, nothing needs to be done to recover data once the database is running again because the application can access the data.

The situation becomes more complicated, however, when central registration services where tenant assignments to database backends are stored are involved and, for instance, where a "rolling failover system" is implemented. In such an implementation, a decision is made dynamically at runtime as to which database instance is going to be used as a master instance and which one is going to be used as a replication instance, e.g., according to a predefined algorithm. This decision may happen for each tenant separately, although shared resources are involved. This in turn implies that the master instance of a tenant could be a replication instance of another tenant. Thus, if one instance is down, it is possible to switch each tenant affected by the failure event to a new database instance. For instance, all tenants using a failed instance as a master may have their replication instances designated as their new masters, and an attempt may be made to find a new replication instance for each affected tenant.

Figure 3:
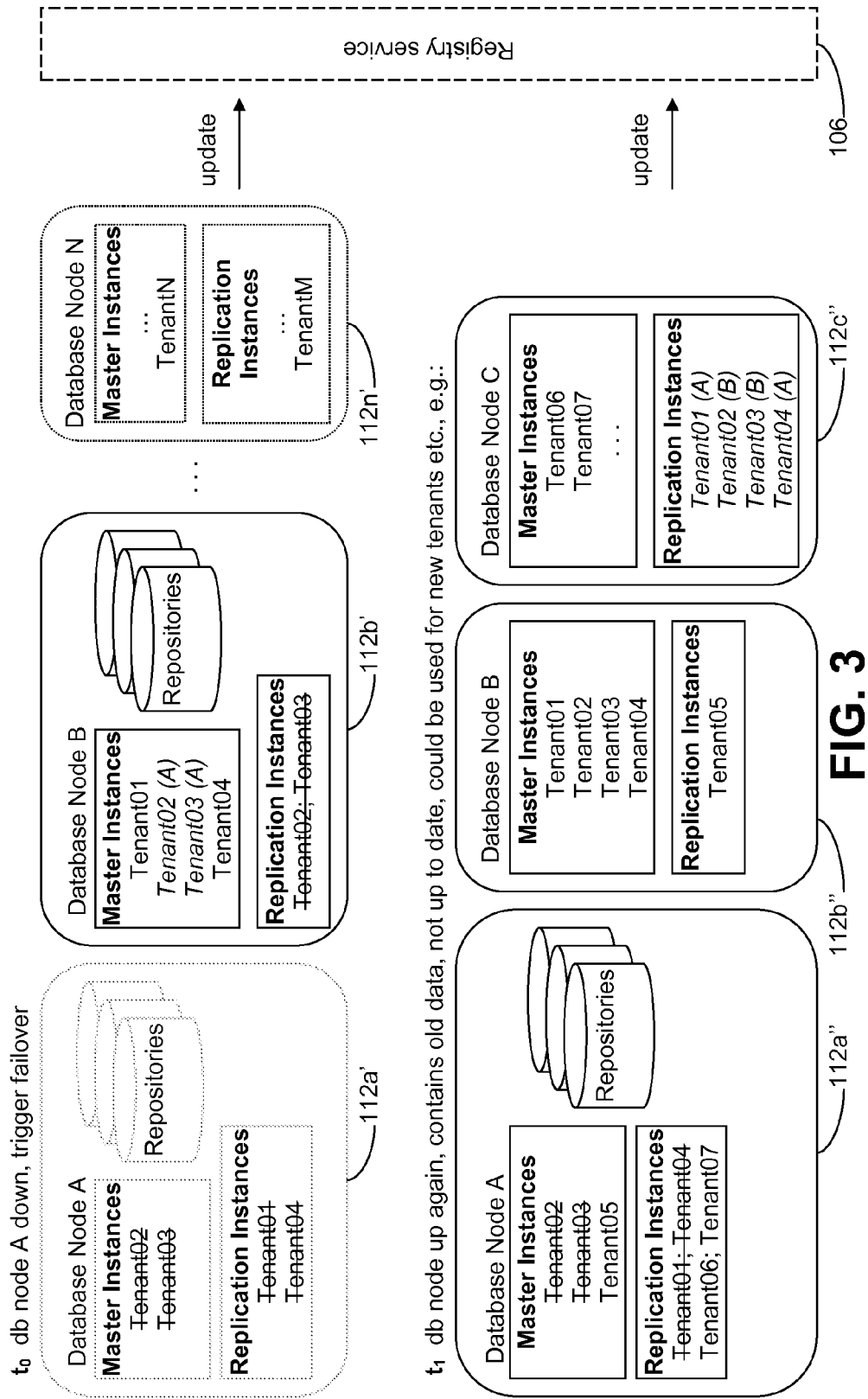
FIG. 3 is a block diagram showing tenant distribution before and after an illustrative failover event.

FIG. 3 is a block diagram showing tenant distribution before and after an illustrative failover event. When a database node goes down, a rolling failover is performed, which means that for each master instance on the node that went down, the corresponding replication instances are made the new masters and an attempt is made to setup a new replication node with replication instances. More concretely, in the example in FIG. 3, there are two tenants (namely, Tenant02 and Tenant03) that both use database node A as their master instances and database node B as their replication instances. Tenant01 and Tenant04 use the database node B as master instances and node A as their replication instances. After a failover is triggered (e.g., because node A cannot be reached), all tenants of node A are assigned to new instances. Here, database node B contains the master instances for Tenant01, Tenant02, Tenant03, and Tenant04. The updated master and replication instance assignments are shown in FIG. 3 as updated database nodes A-N 112a'-112n'.

Once database node A becomes available again, it contains old data with respect to the tenants for which it was a master instance (Tenant02 and Tenant03), and for which it was a replication instance (Tenant01 and Tenant04). It may, however, serve as a master and/or replication instance(s) for new tenants, e.g., as further failover events occur. The further updated master and replication instance assignments are shown in FIG. 3 as twice updated database nodes A-C 112a"-112c". The registration service 106 with tenant assignments is used to keep track of such operations.

Losing the registration information from the registration service 106 could mean that no data in the datacenter is lost (e.g., in that the data might still be physically available in the databases), even though it is inaccessible because the assignments in the registry service are lost. The data in the datacenter thus could in effect be lost, even though it remains physically present. This can happen if a backup of this registry did not occur, is inconsistent itself and cannot be restored, if the backup did not happen in real-time and is outdated, etc. In some cases, all of or certain parts of the registration information may be lost, and there might not be a chance to recover the prior tenant assignments and, thus, the system may not know which instances contain the most current data for one tenant.

In this regard, FIG. 4 is a block diagram showing what happens when registry information is lost as a result of a system crash. Because the assignment information is absent from the failed registry service 106', it is no longer possible to access the data in the datacenter 104. In other words, in this scenario, it will be appreciated that the web application itself may use only the assignments in the registry service to access the backend database assigned as master. And because assignments are not present, the backend databases cannot be accessed.

A similar situation is encountered in terms of inconsistencies in the registration service caused by faulty entries from a client application that uses this service, e.g., as some or all applications in an infrastructure usable in connection with certain example embodiments may have read/write access to the service registry. Inconsistencies can even happen through system crashes while writing to the registration service in a bootstrapping process, by way of manual "corrections" (that are not in fact correct) carried out by an administrator, etc.

Figure 5:
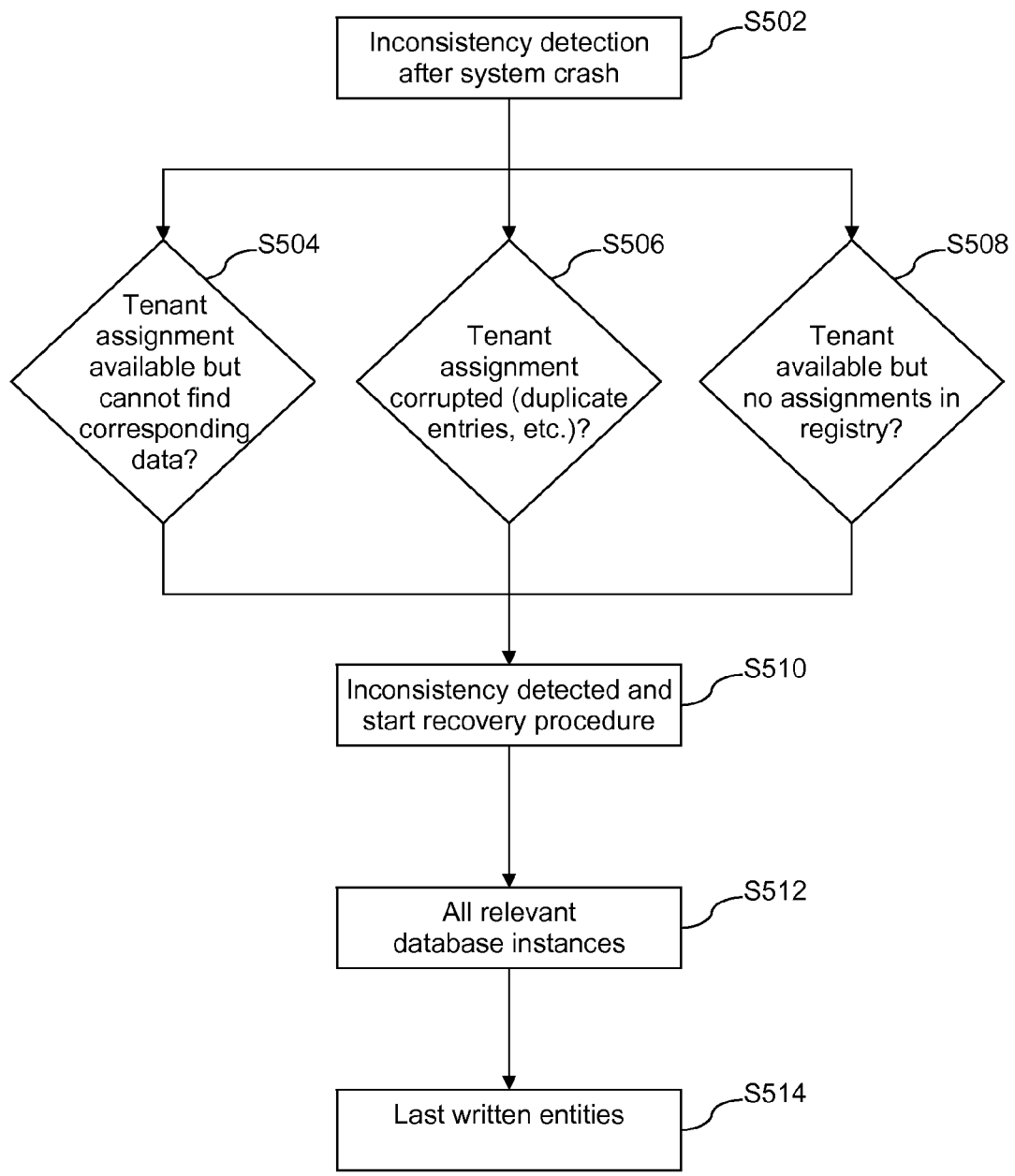
FIG. 5 is a flowchart showing inconsistency detection and recovery operation initiation.

FIG. 5 is a flowchart showing inconsistency detection and recovery operation initiation, which would be desirable. In step S502, inconsistency detection following a system crash is initiated. Checks are made as to whether tenant assignment information is available but corresponding data cannot be located (step S504), whether tenant assignment information is corrupted (e.g., by virtue of duplicate entries or the like) (step S506), whether tenant assignment information is available but there are no assignments in the registry (step S508), etc. If any one or more of such checks returns a positive result, then an inconsistency is detected and a recovery operation is initiated in step S510. A search is made in the databases for relevant tenant-related data, and a list of all relevant database instances is returned in step S512. The last written entries from these instances are retrieved in step S514.

Certain example embodiments present a path from the detection of inconsistencies in a registry service to a recovery procedure, e.g., to help determine the database instances including the latest and most up-to-date data from a specific tenant. With this information, it becomes possible to recreate the entire registry for all tenants and, in the end, recover all of the data, at least in some example scenarios.

In some failure scenarios, there is no reliable backup including the most up-to-date data and/or inconsistencies are present in the registry service. Certain example embodiments thus may initiate a recovery procedure. This procedure may be automatically or manually triggered, e.g., by an administrator, by a script, etc., after realizing that there has been a potential data loss. This may occur, for instance, when there is knowledge about the fact that registry information was lost and cannot be restored from a simple backup. Cf. FIG. 5. To enable an automatic recovery procedure in a distributed and scalable environment, certain example embodiments may help ensure that it is possible to retrieve the data with timestamps including, for example, the time and/or date when the data was written to the database.

If timestamping is not performed automatically (e.g., at the server side with, for example, every accession of the registry service; every read, write, or other operation made with respect to a backend component; etc.), a like feature may be enabled on the application side. Alternatively, both server-side and application-side timestamp writing may be enabled in certain example embodiments. To achieve application-side timestamping, certain example embodiments may write a timestamp for every entity saved to the database. Additionally, or in the alternative, certain example embodiments may store a "timestamp object" with every write operation. See, for example, the more detailed discussion of FIG. 9 below.

Figure 6:
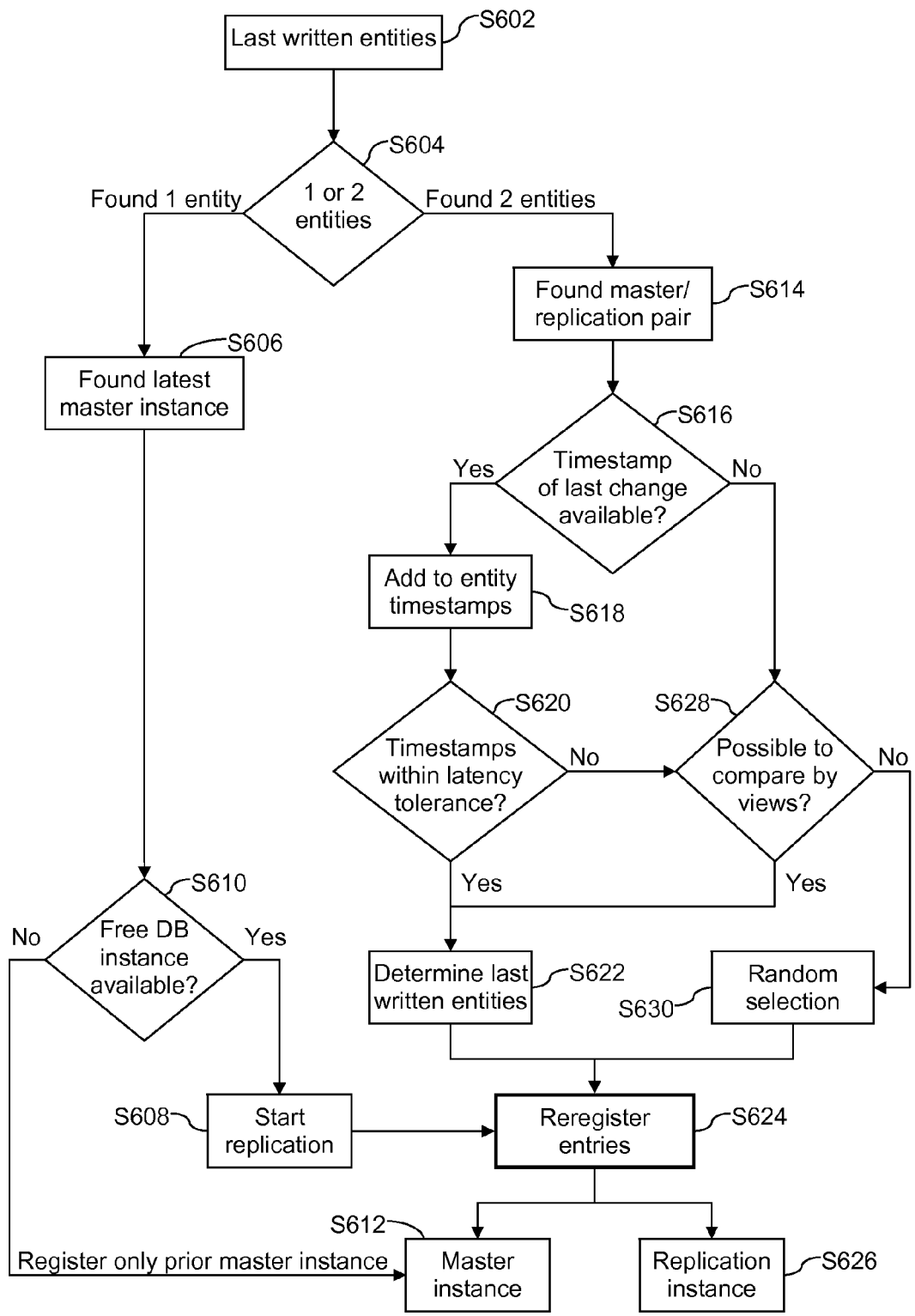
FIG. 6 is a flowchart showing an example recovery process that may be used in accordance with certain example embodiments.

FIG. 6 is a flowchart showing an example recovery process that may be used in accordance with certain example embodiments. The timestamp operations of certain example embodiments facilitate the retrieval of the latest written entities from a database instance (e.g., in step S602). That is, the latest written entry of each database instance may be retrieved. After looking into each database instance to determine whether data exists from the currently processed tenant, it is possible to compare those timestamps with the last written entities from other instances, e.g., to find a master/replication pair for a specific tenant. This allows certain example implementations to roughly recreate the registry entries, assuming that the replication and master instance include the same data (which may be true in connection with certain example embodiments), as replication is only performed when writing to the master instance was successful in certain example embodiments. Nevertheless, the entities may be compared to see if they are equal. If only one entity is retrieved (e.g., in step S604), the last master instance is present (e.g., in step S606), and it is possible to reassign this instance again and start the replication (e.g., in step S608) if a free database for replication is available (as determined, for example, in step S610). The latter case can happen if a tenant had no replication instance assigned, if the write operation to the replication instance failed and therefore the instance is no longer synchronized, etc. It is noted that if there are no free databases available (e.g., as determined in step S610), the only the prior master instance is registered as the new master instance (e.g., in step S612). Otherwise, re-registration may take place (e.g., in step S624), with respect to both the master and replication instances (e.g., as indicated in step S612 and S626, respectively)

The reference to "roughly" recreating the registry is indicative of the fact that it may not be possible to determine with absolute certainty in all possible scenarios which is the master and which is the replication if only two equal entities with the same timestamps are retrieved (e.g., with the retrieval indicated in step S602, the determination in S604, and the state in step S614). To achieve a better overall restoration result (e.g., that is more likely to match with the pre-failure state, etc.), several techniques may be used to help determine with an increased probability which retrieved instance was the master and which one was the replication instance. Obtaining the "real" or "proper" master/replication assignments reduces the likelihood of the master/replication assignments being placed in an unbalanced state (e.g., because an algorithm may be used to initially distribute the tenants over available instances in a balanced or otherwise at least partially optimized manner). As a result, potentially time- and/or resource-intensive rebalancing tasks may not be needed. It also will be appreciated that getting the wrong assignments (e.g., assigning the master instance as a replication instance, and vice versa) could in some cases lead to additional performance issues after the reassignment operations, e.g., because the replication instance may not have cached views, etc. These performance issues may be problematic for the first number of accessions, e.g., as a cache is rebuilt, etc., although they may subside over time. Nevertheless, even if a master is mistakenly assigned as a replica and vice versa, the potential drawbacks of unbalanced distributions, lack of cached views, etc., there still will be a recreated registry with the most up-to-date data from one tenant and thus, data loss, may be guarded against. And as alluded to above, performance optimizations such as load balancing, caching operations, etc., may "even out" over time. Thus, even if there are short term issues, they may be resolved over time, and the techniques are still very advantageous in terms of reducing the likelihood of unrecoverable data loss events taking place, etc.

A description will now be provided for example techniques for obtaining timestamps for the exact time the entity was written and/or additionally or alternatively obtaining a timestamp for the last time the database was updated. For both approaches, a "latency tolerance" is defined. The latency tolerance is a defined timeframe in which it is assumed that the write operation was performed in, while writing to a replication instance. For instance, if the last update timestamp from the database was much newer, such information may not be used to distinguish between the two pairs. These two "time-based" approaches are described in greater detail below in connection with FIGS. 7-9; however, a brief description will now be provided.

If timestamp information is available (e.g., in step S616), then the retrieved timestamp information is associated with the retrieved entities (e.g., in step S618). If the timestamps are within the latency tolerances (e.g., as determined in step S620), then it is possible to determine the latest written entities (e.g., in step S622) and re-registration of the master and replication instances may be performed (e.g., in step S624), e.g., and the master and replication instances can be accessed again (e.g., as indicated by steps S612 and S626, respectively).

If it timestamps related to the entities themselves or the last database changes cannot be obtained (e.g., as in as determined in steps S616 or S620, respectively), alternative steps may be taken to try to obtain relevant time-related information. For example, an attempt may be made to obtain more information on the views in a database (e.g., in step S628). It will be appreciated that on replication instances, the caches of the views generally are not replicated and likely grow only by accessing the instance with read operations. This may happen in certain example implementations only if a database instance is the current master instance. Thus, by requesting the size of a view, it may in some cases be possible to distinguish between the master and replication instances, e.g., by taking the one with the bigger view as master instance and the other as the replication instance. If a determination can be made on this basis, then reliable re-registration can be performed and the master and replication instances can be made available again (e.g., by virtue of steps S622, S624, S612, and S626). On the other hand, if this is not possible, and a random or other determination may be made (e.g., in step S630), and the master and replication instances can be made available again (e.g., by virtue of steps S624, S612, and S626).

In certain example embodiments, and as alluded to above (e.g., in connection with FIGS. 3-4), it is possible to have several instances that contain outdated data from one tenant. This could happen if the failover mechanism was triggered several times. As a result, it may be surmised that a particular tenant has had more than two database instances in the past, but only one or two contain the latest and present data. Only one instance exists if a master instance without replication has been assigned, or two would exist if this tenant has had a master/replication pair assigned in the past. Thus, there may be handling built into certain example embodiments to deal with a scenario where there are more than two retrieved instances. This may include, for example, using the techniques described above (e.g., in terms of timestamp checking, view size and/or other comparisons, etc.) to determine which two of the more than two instances likely are the master and replication instances, and proceeding based on this basis.

For instance, certain example embodiments may attempt to create a view or the like in the database that provides the most up-to-date datasets. From a performance perspective, the procedure may take place in linear time or O(N) (or approximately this timescale) procedure if iterations over the datasets are needed, and the procedure may take place in constant time or O(1) (or approximately this timescale) if a view is used and it is already cached on the master instance. On the replication instance, a read cache may not be present, but many databases may use well-designed algorithms to create fast views, which could make these operations easier to implement and faster to execute. Of course, this view cannot be used anymore (e.g., because it could be out of date as a result of the failure, etc.), but all other views may still be useful for the "size check" and/or other procedures described above. If it is known how long it takes to obtain this data from a view that was already created and compare it with the replication instance's view, this information can also be used to determine the real master or replication instance.

In brief, the following and/or other functionalities may be implemented to help determine the last active instance or instances of a specific tenant, reassign them, and re-register them with the registry service:
  Obtain a list of all running database instances of databases;
  Determine if a database instance is a possible candidate for a tenant (and it may be possible to restrict the number of possibilities by choosing the correct data center or availability zone, for example);
  Obtain the timestamps of the last written entities within a database instance;
  Record all instances with the retrieved timestamps of the entities;
  Use the instance with the most up-to-date datasets as a master instance and register this instance again; and/or
  If two instances with exactly the same timestamps are found or only with a small difference (e.g., caused by network latency or the like), compare the data and, if the entities are equal to each other, a replication/master instance pair has been found and can be bundled and registered again.

As alluded to above, this may be obtained from the application side and/or the server side, in certain example embodiments. It also will be appreciated that several availability zones may be used in certain example embodiments (e.g., for Europe, USA, etc.). In these zones, there may be several datacenters. In these datacenters, there may be several database instances deployed. If it is known that a tenant only uses the availability zone USA, then it may not be necessary to search all datacenters and all database instances in the availability zone in Europe. Performance improvements thus may be realized by taking into account availability zones.

Example Detailed Implementation

A more detailed example implementation will now be provided. As alluded to above, the automatic recovery of distributed data of a tenant may be facilitated by writing a timestamp in every entity written to the database, and retrieving all possible data from a database instance that belongs to a specific tenant and sorting this data according to the time it was saved. Once these operations are performed, it becomes possible in certain example instances to re-register a master instance, and either re-register a replication instance (if one exists), create a new one (if possible), or proceed without one. The example implementation is described in connection with a three phase process, shown and described in connection with FIGS. 7-9.

Phase I: Saving Entities

In certain example embodiments, some or all entities may implement an interface for writing the timestamp to this "chunk" of data. The following is an example:
—Entity Implements RecoveryDateDetails In this example, the Interface "RecoveryDateDetails" may include at least the method setCurrentTime( ). This may, for instance, be represented as follows:

```
Interface RecoveryDateDetails {
    setCurrentTime();
}
```

In addition, or in the alternative, certain example embodiments may use an object that must is stored with every write operation (e.g., in the database itself, in a separate repository, and/or the like). However, a date attribute may be used to determine the last change of a dataset, regardless of where and how stored and a special or dedicated object need not be recorded in all implementations.

Phase II: Retrieving Lost Data

After a system crash, if all of the registration data is lost, all that may remain is a list from the registration service stating which database instances are up and running. This information is attainable because certain example embodiments may be configured such that every instance registers itself as soon as it is started. However, the instances may have no knowledge about the origin of the data stored on their nodes.

Figure 7:
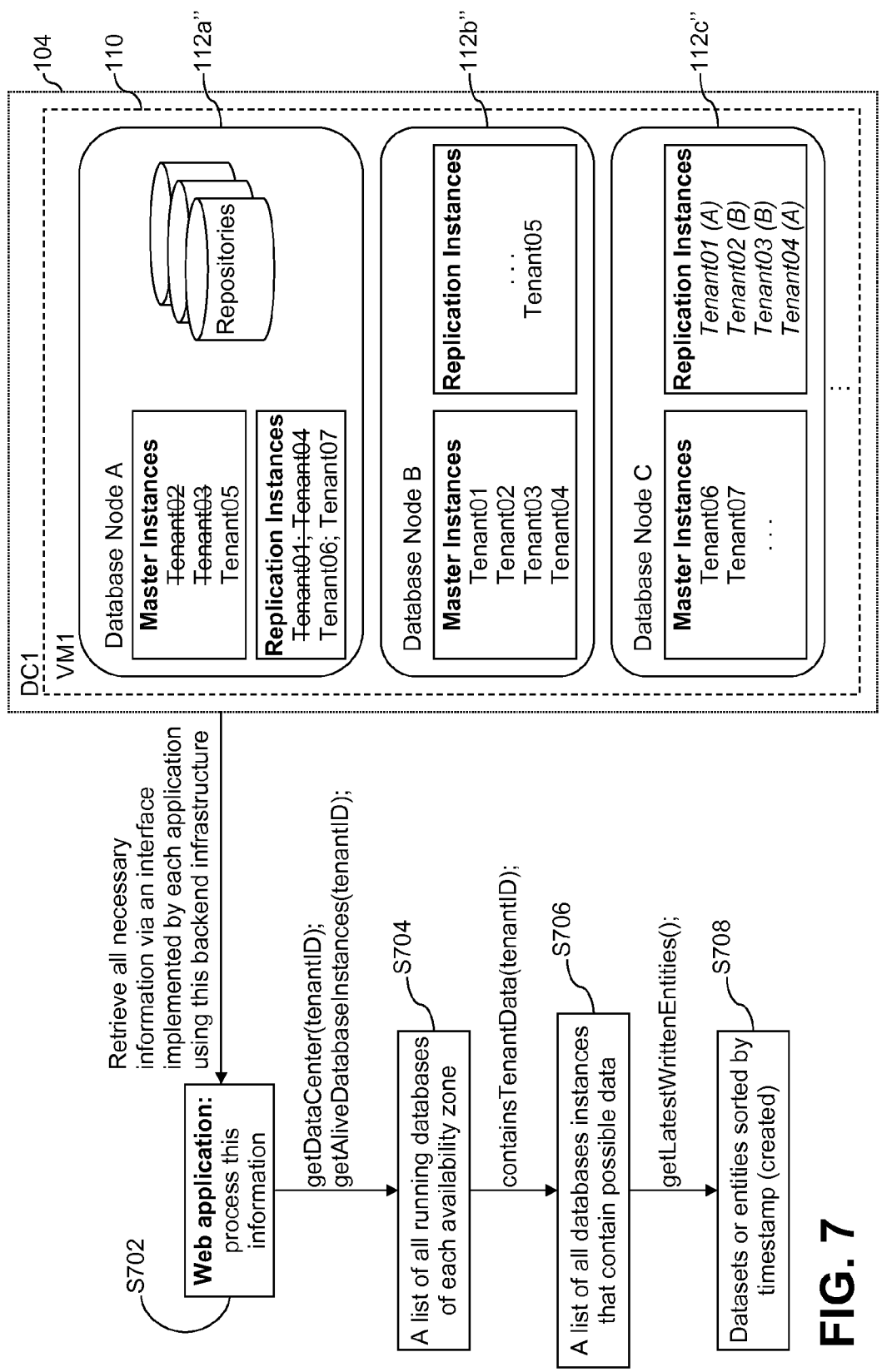
FIG. 7 is a first part of a procedure that may be used to recover data in accordance with certain example embodiments.

FIG. 7 is a first part of a procedure that may be used to recover data in accordance with certain example embodiments. As indicated above, if registration information is lost, it may not be possible to access data, even though it is still available in the physical or virtual machines that back the databases. However, information may be retrieved via an interface implemented by each application using the back-end structure, and the data may be extracted in several steps (e.g., as indicated by the process beginning in step S702). In this regard, the functions getdataCenter(tenantId) and getAliveDatabaseInstances(tenantId) may be performed.

An attempt could be made to try to determine the region of the datacenter in which the tenant was deployed. In other words, a list of running databases of each availability zone may be developed (e.g., in step S704). Therefore, the possibilities of where the database instances of the tenant could be found may be limited, thereby improving performance by potentially avoiding the need to look at database instances that are known in advance to not contain any data of a specific tenant.

In response to a list of all running database instances becoming available (potentially on an availability zone by availability zone basis), an instance could be examined to try to locate data that belongs to the current tenant, e.g., by performing the function containsTenantId(tenantId). In certain example embodiments, this may be performed by comparing the suffix of a repository, e.g., if it contains the ID of the tenant.

In response to a list of all database instances that have been used by this tenant in the past being determined (e.g., as in step S706), a look-up at the instance(s) may be initiated using a view that delivers the last written entities. For instance, the getLastWrittenEntities( ) method may be performed, e.g., to provide a listing of datasets or entities sorted by timestamp (e.g., indicating a create time) or the like (e.g., as in step S708).

Comparing all entities leads to the most up-to-date data of one tenant. In the illustrated example, it is determined that data from Tenant02 is located on nodes A, B, and C. Yet only nodes B and C contain the most up-to-date entities, and in which node B was the master instance and node C was the replication instance. At this point, however, this is not directly seen when looking at a node, and more data may be examined before coming to a conclusion.

Figure 8:
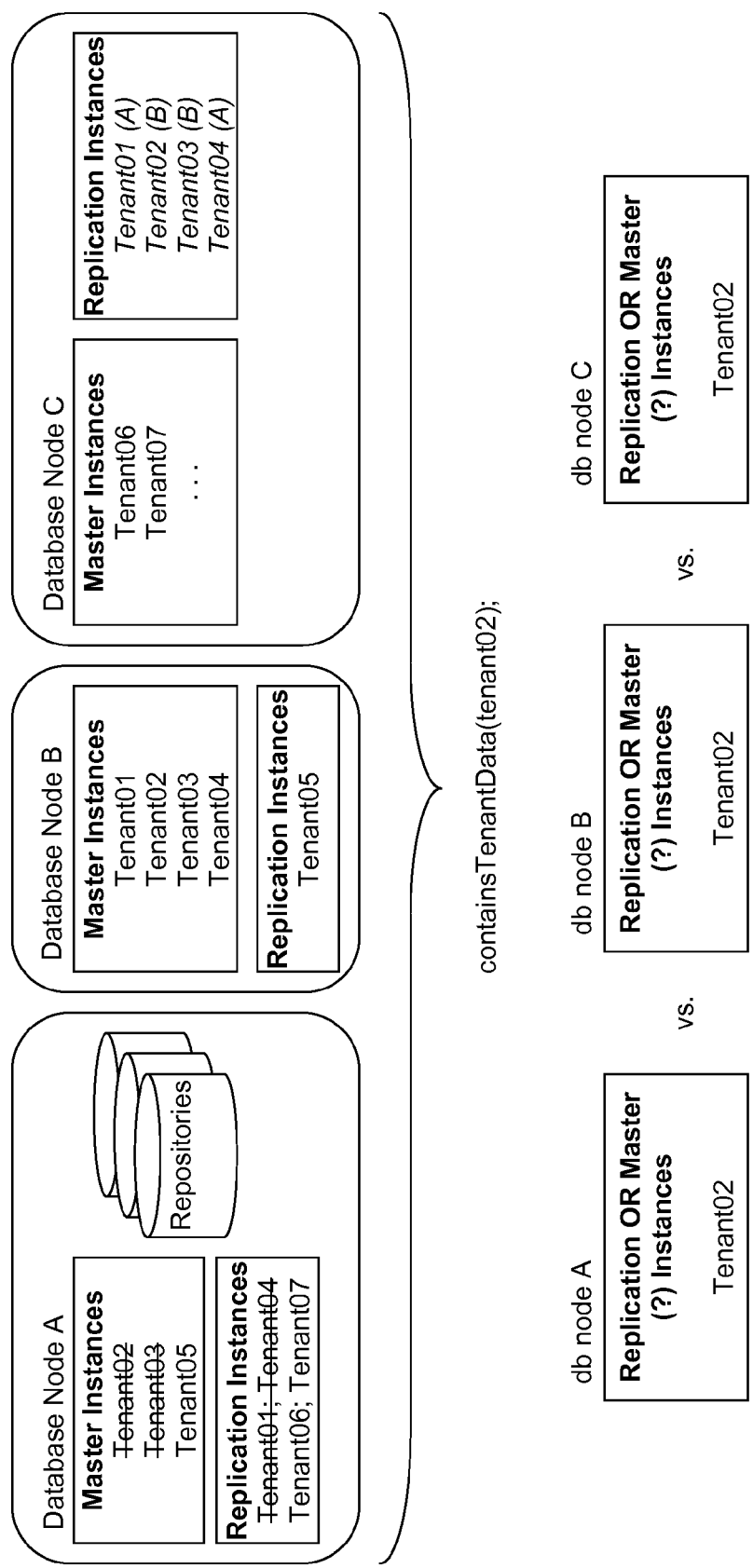
FIG. 8 is a second part of a procedure that may be used to recover data in accordance with certain example embodiments.

FIG. 8 is a second part of a procedure that may be used to recover data in accordance with certain example embodiments. It is assumed that the information from FIG. 7 is from a backend having a state shown in the upper portion of FIG. 8. Database node A still includes data from Tenant02 and Tenant03 but, because of a switch to their replicates, they only include outdated entities. This is determined, in part, using the containsTenantData(tenant02) function call. The result at the bottom of FIG. 8 is a list of three entities.

It is not yet possible to determine which one is the most up-to-date entity and whether the last time it was used was as a master instance or as a replication instance. However, a comparison can be made between nodes A, B, and C to determine which nodes include the master and replication instances. That is, with the gathered information, it may in certain example embodiments be possible to we select the last two written entities and to determine the nodes hosting the master and replication instances, even though the determination of which one is the master and which one the replication may be left to subsequent operations.

A "latency tolerance" is defined such that evens that occur within the defined time period are assumed to represent the same data. In other words, this network latency or write latency difference indicates that the data is from a master and replication instance pair. To help improve accuracy, a comparison may be made for data with "nearly equal" timestamps. If they are equal except for the timestamps (e.g., with a minimal difference defined in accordance with the latency tolerance), these two instances can be as a master/replication pair. If this technique cannot be used or cannot be used reliably, then an alternative technique such as one described above may be used instead.

Figure 9:
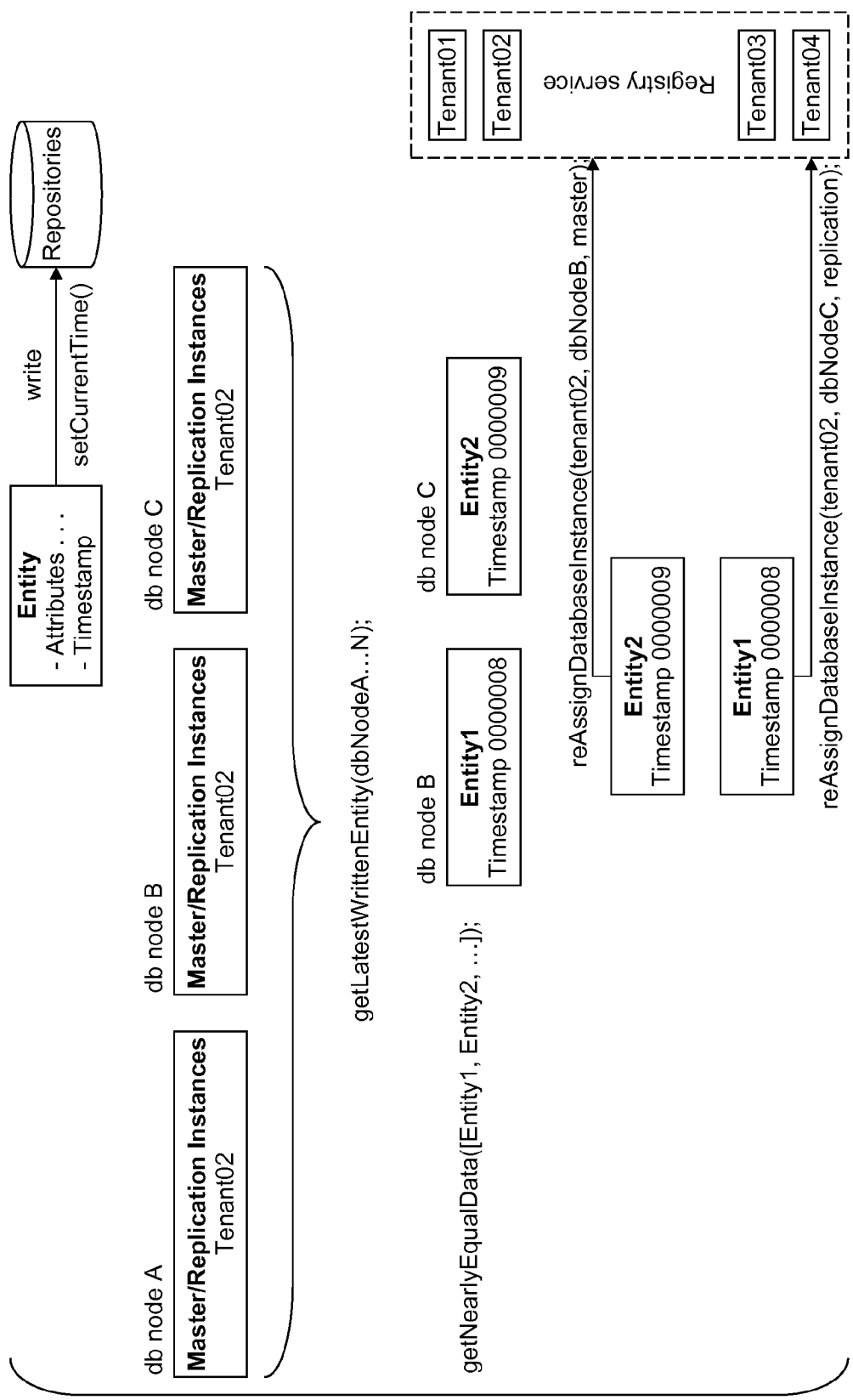
FIG. 9 is a third part of a procedure that may be used to recover data in accordance with certain example embodiments.

This general approach is shown in FIG. 9, which is a third part of a procedure that may be used to recover data in accordance with certain example embodiments. As shown in FIG. 9, entities are tagged with attributes and timestamps. On operations, entities with the current time are stored to the repositories. The three nodes identified above are introspected, and the function getLatestWrittenEntity( ) is used for each involved node. The timestamps are then compared to identify which have nearly equal data. The corresponding function in this example scenario returns nodes B and C. By comparing the retrieved entities, not only the latest data is found, but also the latest master and replication instances are identified. Thus, it is possible to return to the prior balanced status, new views do not need to be created, etc. Instead, the entities can simply be re-registered as master and replication instances with the registry service. That is, as indicated above, the database instance containing the most up-to-date entities once again becomes the new master instance, the other one becomes the replication instance.

As will be appreciated from the above, program logic may be used to implement the above-described and/or other related processes. Java code may, for instance, be used to implemented an interface that supply the following and/or other methods:

```
RecoveryService implements DistributedDataRecovery
Interface DistributedDataRecovery {
    List<DataCenter> getDataCenter(tenantId);
    List<DatabaseInstance> getAliveDatabaseInstances(tenantId);
    boolean containsTenantData(tenantId);
    Entity getLatestWrittenEntitiy(DatabaseInstance);
    List<Entity> getNearlyEqualData(List<Entity>);
    DatabaseInstance getDatabaseInstace(Entity);
    reAssignDatabaseInstance(tenantId, DatabaseInstance, InstanceType);
}
```

By carrying out the example procedure set forth above for each tenant, it becomes possible in certain example instances to recover all of the database instances in a highly distributed cloud computing or other environment, e.g., even after a loss of all registration information.

It will be appreciated that certain example embodiments may implement a load balancer in front of the web application, e.g., to handle incoming requests from multiple calling client applications, devices, and/or the like.

In certain example embodiments, when a database node hosting a master instance goes down, certain example embodiments may initiate a switch such that the replication instance is directly made the new master instance, a free node is used as a new replication instance, and this information in stored in the registry service. It will be appreciated that other algorithms may be used in different example embodiments, e.g., to determine which node(s) to use for the new master, replication, etc. The algorithm may, for example, take into account relative proximity of physical and/or virtual servers (e.g., for expected performance purposes), actual or expected loads on the nodes (e.g., for load balancing purposes), number of tenants for which the node is assigned to serve as a master and/or replication instance (e.g., for load balancing purposes), priority or importance of the underlying data (e.g., to help ensure that high availability nodes are used for important system functions and/or the like), etc.

Although certain example approaches for how to solve the problem of finding the master and the replication instances have been described above, it will be appreciated that other techniques could be used in addition to, or in place of, these example techniques. That is, timestamp checking may be used (e.g., assuming that there are timestamps and/or other time-related information all, if an assumption can be made that the server are synchronized, etc.), but other approaches may be used together with or in place of these techniques. For instance, it may in certain example embodiments be possible to compare the sizes of views, e.g., as master instances oftentimes will include views with larger sizes because of the increased likelihood of there being more cached entries, etc. The particular aspects or indicators may be specific to the database system and/or specific implementation. However, once one or more aspects or indicators from the backend system that can be used to decide which instances are masters and which instances are replications have been identified, they may be consulted in a predetermined or other order to help make the relevant assignments. Of course, as explained herein, even if there are no "clues" as to which instances are masters and which instances are replications, it is possible to randomly or otherwise assign identified candidate instances. The random or other assignment may require some additional operations at the backend side, e.g., to create views again, etc., but these performance drawbacks may be temporary and mitigated by the fact that the system will in fact come back online.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of recovering from a fault in a multi-tenant distributed environment comprising processing resources including at least one processor and in which a registry stores information indicating which of a plurality of nodes in the multi-tenant distributed environment are assigned to host master and replication instances storing data for respective tenants, the method comprising, in response to a detected fault:
   obtaining a list of running instances in the multi-tenant distributed environment;
   identifying from the list of running instances, for each tenant, one or more candidate instances that might host master and/or replication instances for the respective tenant;
   for each tenant for which exactly one candidate instance is identified, re-registering with the registry this identified candidate instance as the master instance for the respective tenant; and
   for each tenant for which exactly two candidate instances are identified:
   determining whether timestamps of the last changes for each of these two candidate instances are available, and
   in response to a determination that timestamps of the last changes for each of these two candidate instances are available, re-registering with the registry the two candidate instances as master and replication instances for the respective tenant based at least in part on the timestamps.

2. The method of claim 1, further comprising, for each tenant for which exactly one candidate instance is identified:
   determining whether there is a free instance on a node that does not host this candidate instance;
   in response to a determination that there is not a free instance on a node that does not host this candidate instance, re-registering with the registry this identified candidate instance as the master instance for the respective tenant and not re-registering a replication instance for the respective tenant; and
   in response to a determination that there is a free instance on a node that does not host this candidate instance:
   re-registering with the registry this identified candidate instance as the master instance for the respective tenant,
   replicating this identified candidate instance, and
   re-registering with the registry this replicated identified candidate instance as the replication instance for the respective tenant.

3. The method of claim 1, further comprising for each tenant for which exactly two candidate instances are identified and in response to a determination that timestamps of the last changes for each of these two candidate instance are available:
   determining whether the timestamps fall within a predefined latency tolerance; and
   in response to a determination that the timestamps fall within the predefined latency tolerance, re-registering with the registry the two candidate instances as master and replication instances for the respective tenant based at least in part on the timestamps and based at least in part on which instance has later written entities.

4. The method of claim 3, further comprising for each tenant for which exactly two candidate instances are identified, and in response to determinations that (a) the timestamps of the last changes for each of these two candidate instance are unavailable, and (b) the timestamps do not fall within the predefined latency tolerance:
   re-registering with the registry the two candidate instances as master and replication instances for the respective tenant based at least in part on information about views defined in the two candidate instances and based at least in part on which of the two candidate instances has later written entities, when it is possible to gather the information about the respective views of the instances.

5. The method of claim 4, wherein the information about views relates to which of the two candidate instances has a larger number and/or size of views.

6. The method of claim 4, further comprising when it is not possible to gather the information about the respective views of the two candidate instances, re-registering with the registry the two candidate instances as master and replication instances for the respective tenant based on a random assignment.

7. The method of claim 1, wherein timestamps are stored in response to calls from a web application.

8. The method of claim 1, further comprising initiating a rolling failover operation in response to other faults dealing with an instance becoming unavailable.

9. A method of operating a distributed multi-tenant environment, the method comprising:
   storing in a registry master/replication instance pairings indicating, for each tenant in the distributed multi-tenant environment, which backend nodes serve as master and replication data instances for the respective tenant;
   operating, using processing resources including at least one processor, a web application in response to a request from a client device, the web application accessing an appropriate master instance in dependence on the tenant using the client device and based on a lookup using the Registry;

saving time-related information for each operation performed on each entity in each instance;

in response to a first fault type causing a master instance to become unavailable, updating the corresponding master/replication instance pairing in the registry such that the associated replication instance becomes the new master instance in that pairing and such that a free instance becomes the new replication instance in that pairing, using processing resources; and in response to a second fault type causing the registry to become unavailable:
  identifying at least one candidate instance for each tenant to be used in recreating the registry and master/replication instance pairings in the recreated registry, and
  for each tenant for which two or more candidate instances are identified, processing time-related information to recreate the registry and master/replication instance pairings in the recreated registry, using the processing resources.

10. The method of claim 9, further comprising for each tenant for which only one candidate instance is identified, registering in the registry the one identified candidate instance as the master instance in the master/replication instance pairing for the respective tenant and, if possible, assigning a free instance as the replication instance for the respective tenant and registering the assigned free instance in the master/replication instance pairing.

11. The method of claim 9, wherein the processing of time-related information further comprises for each tenant for which two or more candidate instances are identified:
  limiting the number of identified candidate instances to two when more than two candidate instances are identified; and
  registering in the registry one identified candidate instance as the master instance and the other identified candidate instance as the replication instance in the master/replication instance pairing for the respective tenant, based at least in part on the time-related information for each of these identified candidate instances.

12. The method of claim 11, further comprising for each tenant for which only one candidate instance is identified, registering in the registry the one identified candidate instance as the master instance in the master/replication instance pairing for the respective tenant and, if possible, assigning a free instance as the replication instance for the respective tenant and registering the assigned free instance in the master/replication instance pairing.

13. The method of claim 11, wherein the processing of time-related information further comprises taking into account network latency data, and/or information about the number and/or size of views defined in the instances, in the registering of the master/replication instance pairing for the respective tenant.

14. The method of claim 9, wherein the time-related information is stored in a dedicated object separate from database structures holding master and replication data instances.

15. The method of claim 9, wherein the time-related information is stored with each instance.

16. At least one non-transitory computer readable storage medium storing instructions that, when executed using processing resources including at least one processor, perform functionality in connection with operating a distributed multi-tenant environment, comprising:

storing in a registry master/replication instance pairings indicating, for each tenant in the distributed multi-tenant environment, which backend nodes serve as master and replication data instances for the respective tenant;

operating, using the processing resources, a web application in response to a request from a client device, the web application accessing an appropriate master instance in dependence on the tenant using the client device and based on a lookup using the registry;

saving time-related information for each operation performed on each entity in each instance;

in response to a first fault type causing a master instance to become unavailable, updating the corresponding master/replication instance pairing in the registry such that the associated replication instance becomes the new master instance in that pairing and such that a free instance becomes the new replication instance in that pairing, using processing resources; and in response to a second fault type causing the registry to become unavailable:
  identifying at least one candidate instance for each tenant to be used in recreating the registry and master/replication instance pairings in the recreated registry, and
  for each tenant for which two or more candidate instances are identified, processing time-related information to recreate the registry and master/replication instance pairings in the recreated registry, using the processing resources.

17. A distributed multi-tenant computing system, comprising:

processing resources including at least one processor;

a non-transitory computer readable storage medium storing a registry including master/replication instance pairings indicating, for each tenant in the distributed multi-tenant computing system, which backend nodes serve as master and replication data instances for the respective tenant; and a server-side application operable in connection with the processing resources and in response to a request from a client application running on a client device, the server-side application being configured to access an appropriate master instance in dependence on the tenant using the client device and based on a lookup using the registry;

wherein the processing resources are configured to at least:
  automatically detect faults of different fault types;
  in response to a detected fault of a first fault type that causes a master instance to become unavailable, update the corresponding master/replication instance pairing in the registry in accordance with a rolling failover scheme; and
  in response to a detected fault second fault type, different from the first fault type, that causes the registry to become unavailable:
    identify at least one candidate instance for each tenant to be used in recreating the registry and master/replication instance pairings therein,
    for each tenant for which only one candidate instance is identified, register the one identified candidate instance as the master instance in the master/replication instance pairing for the respective tenant in recreating the registry, and for each tenant for which two or more candidate instances are identified, process corresponding aspects of each identified candidate instance in order to (a) select, from the two or more identified candidate instances, a candidate master instance and a candidate replication instance, and (b) register the selected candidate master instance and the selected candidate replication instance as a master/replication instance pairing in recreating the registry.

18. The system of claim 17, wherein the processing resources are further configured, for each tenant for which only one candidate instance is identified, to at least assign a free instance as the replication instance for the respective tenant and register the assigned free instance in the respective master/replication instance pairing in recreating the registry, if possible to allocate the free instance.

19. The system of claim 17, wherein the corresponding aspects include time-related information and/or size-related information.

20. The system of claim 17, wherein for each tenant for which two or more candidate instances are identified, a plurality of corresponding aspects are processed in a predetermined order until either (a) it becomes possible to select, from the two or more identified candidate instances, a candidate master instance and a candidate replication instance, or (b) all corresponding aspects have been processed.

21. The system of claim 20, wherein once all corresponding aspects have been processed, candidate master and replication instances are selected at random from the two or more identified candidate instances.

22. A distributed multi-tenant computing system, comprising:
processing resources including at least one processor;
a non-transitory computer readable storage medium storing a registry including master/replication instance pairings indicating, for each tenant in the distributed multi-tenant computing system, which backend nodes serve as master and replication data instances for the respective tenant; and
a web application operable in connection with the processing resources and in response to a request from a client application running on a client device, the web application being configured to access an appropriate master instance in dependence on the tenant using the client device and based on a lookup using the registry;
wherein the processing resources are configured to at least:
save time-related information for each operation performed on each entity in each instance;
in response to a first fault type causing a master instance to become unavailable, update the corresponding master/replication instance pairing in the registry such that the associated replication instance becomes the new master instance in that pairing and such that a free instance becomes the new replication instance in that pairing; and
in response to a second fault type causing the registry to become unavailable:
identify at least one candidate instance for each tenant to be used in recreating the registry and master/replication instance pairings in the recreated registry, and
for each tenant for which two or more candidate instances are identified, process the time-related information to recreate the registry and master/replication instance pairings in the recreated registry.

23. The system of claim 22, wherein the processing resources are further configured to at least register in the registry, for each tenant for which only one candidate instance is identified, the one identified candidate instance as the master instance in the master/replication instance pairing for the respective tenant and, if possible, (a) assign a free instance as the replication instance for the respective tenant and (b) register the assigned free instance in the master/replication instance pairing.

24. The system of claim 23, wherein the processing of time-related information further includes, for each tenant for which two or more candidate instances are identified:
limiting the number of identified candidate instances to two when more than two candidate instances are identified; and
registering in the registry one identified candidate instance as the master instance and the other identified candidate instance as the replication instance in the master/replication instance pairing for the respective tenant, based at least in part on the time-related information for each of these identified candidate instances.

25. The system of claim 22, wherein the processing of time-related information further includes, for each tenant for which two or more candidate instances are identified:
limiting the number of identified candidate instances to two when more than two candidate instances are identified; and
registering in the registry one identified candidate instance as the master instance and the other identified candidate instance as the replication instance in the master/replication instance pairing for the respective tenant, based at least in part on the time-related information for each of these identified candidate instances.

26. The system of claim 22, wherein each instance is backed by a virtual or physical machine running on a datacenter.

27. The system of claim 26, wherein at least some of the machines running on the datacenter are virtual machines.

28. The system of claim 26, wherein a plurality of datacenters are provided, each datacenter including at least one computer.

29. The system of claim 22, further comprising a load balancer interposed between calling client devices and the web application.

30. The system of claim 22, wherein failures are automatically detectable and dynamically recoverable using the processing resources.

* * * * *